UNITED STATES PATENT OFFICE 2,328,065

TREATMENT OF SHEETS AND SIMILAR MATERIALS

Henry Dreyfus, London, England, assignor to Celanese Corporation of America, a corporation of Delaware No Drawing. Application September 29, 1938, Serial No. 232,355. In Great Britain October 7, 1937

2 Claims. (Cl. 18—48)

This invention relates to improvements in the treatment of sheets and similar materials, and particularly in the manufacture of sheets and similar materials having a basis of cellulose derivatives.

Sheet materials made of cellulose acetate are very suitable for use in the manufacture of wind-screens and windows for transport vehicles, for example motor-cars, aeroplanes and railway trains since in the event of an accident such sheets do not splinter and consequently the risk of personal injury is considerably reduced. It has been found, however, that they are liable to become scratched through rough usage or through friction caused by dust-laden air when the vehicles to which they are fitted are travelling at a high speed, and in this respect they are less suitable than glass.

I have now discovered that sheets or similar articles made of cellulose acetate or other organic derivatives of cellulose, and having a reduced tendency to become scratched may be produced by superficially hardening the surface of the articles. The treatment may be applied to one or both sides of the articles.

Sheets made of cellulose acetate or other thermoplastic substance may be heated superficially so that the surface is softened or rendered just fluid and then suddenly cooled. Such a treatment may be carried out, for example, by passing the sheets first between a pair of steam heated rollers and then between a pair of rollers which are cooled, e. g., to a temperature of 20° C., 0° C. or less.

The following example illustrates the invention but is not to be regarded as limiting it in any way:

Example

A cellulose acetate sheet is superficially softened by passing it between rollers heated to a temperature of about 180° C. and then rapidly cooled by passage between rollers at or below atmospheric temperature.

While the process and products of the present invention are of particular value in the production of wind-screens and windows for transport vehicles, they are not limited to such articles, but may be employed generally in cases in which sheets, films or foils are required as, for example, for photographic film bases.

Having described my invention, what I desire to secure by Letters Patent is:

1. Process for providing with a hardened surface, transparent sheet materials suitable for use in wind screens and windows for vehicles, including aircraft, said materials having a basis of a thermoplastic organic derivative of cellulose and being substantially homogeneous as regards their chemical composition, which comprises first applying heat to the sheet in such a way that the sheet is softened superficially and not throughout its thickness, and then rapidly chilling the hot surface of the sheet.

2. Process for providing with a hardened surface, transparent sheet materials suitable for use in wind screens and windows for vehicles, including aircraft, said materials having a basis of cellusose acetate and being substantially homogeneous as regards their chemical composition, which comprises first applying heat to the sheet in such a way that the sheet is softened superficially and not throughout its thickness, and then rapidly chilling the hot surface of the sheet.

HENRY DREYFUS.